(12) United States Patent
Clark et al.

(10) Patent No.: US 7,335,056 B1
(45) Date of Patent: Feb. 26, 2008

(54) RJ TO RJ SWING PANEL

(75) Inventors: Gordon P. Clark, Eden Prairie, MN (US); Loren J. Mattson, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/583,987

(22) Filed: Oct. 19, 2006

(51) Int. Cl.
*H01R 13/60* (2006.01)

(52) U.S. Cl. .................................. 439/540.1; 439/534

(58) Field of Classification Search ............... 439/731, 439/906, 540.1, 676, 638, 534, 713, 654
See application file for complete search history.

(56) References Cited

U.S. PATENT DOCUMENTS

| | | | |
|---|---|---|---|
| 5,622,506 A * | 4/1997 | Hornig et al. ............... 439/74 |
| 6,504,726 B1 | 1/2003 | Grabinger et al. | |
| 6,537,106 B1 | 3/2003 | Follingstad | |
| 6,608,764 B2 | 8/2003 | Clark et al. | |
| 7,048,550 B2 * | 5/2006 | Hyland et al. ............... 439/67 |

* cited by examiner

*Primary Examiner*—Tho D. Ta
(74) *Attorney, Agent, or Firm*—Merchant & Gould P.C.

(57) ABSTRACT

A telecommunications patch panel includes a frame and multiple connector modules mounted to the frame. The connector modules are pivotally movable about generally upright pivot axes that extend between upper and lower portions of the frame. Each connector module includes a circuit board, front connector ports mounted to the first side of the circuit board; rear connector ports mounted to the second side of the circuit board; and a housing enclosing the circuit board. The housing can be formed from a first housing shell cooperating with a second housing shell to capture the circuit board.

11 Claims, 20 Drawing Sheets

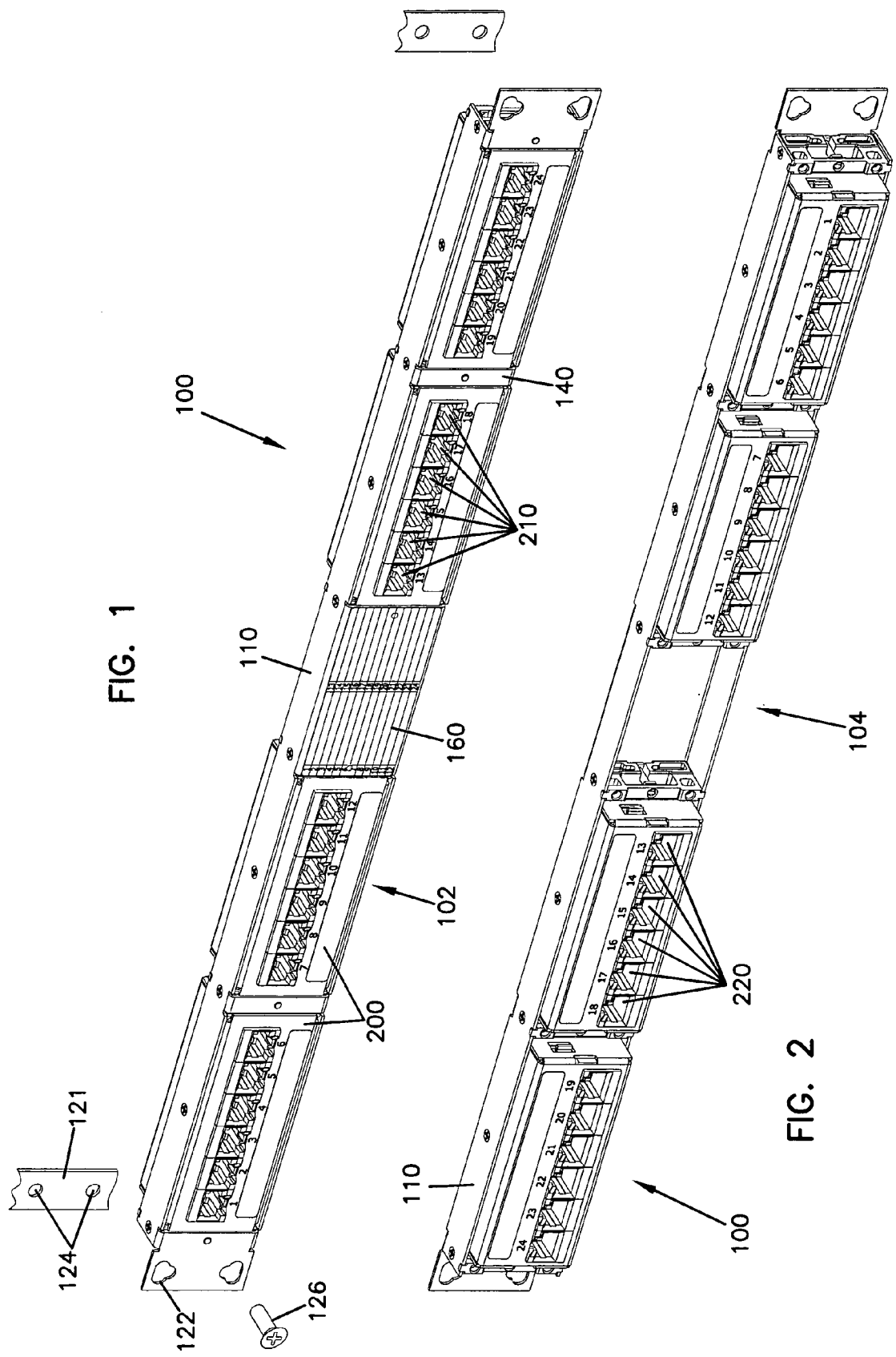

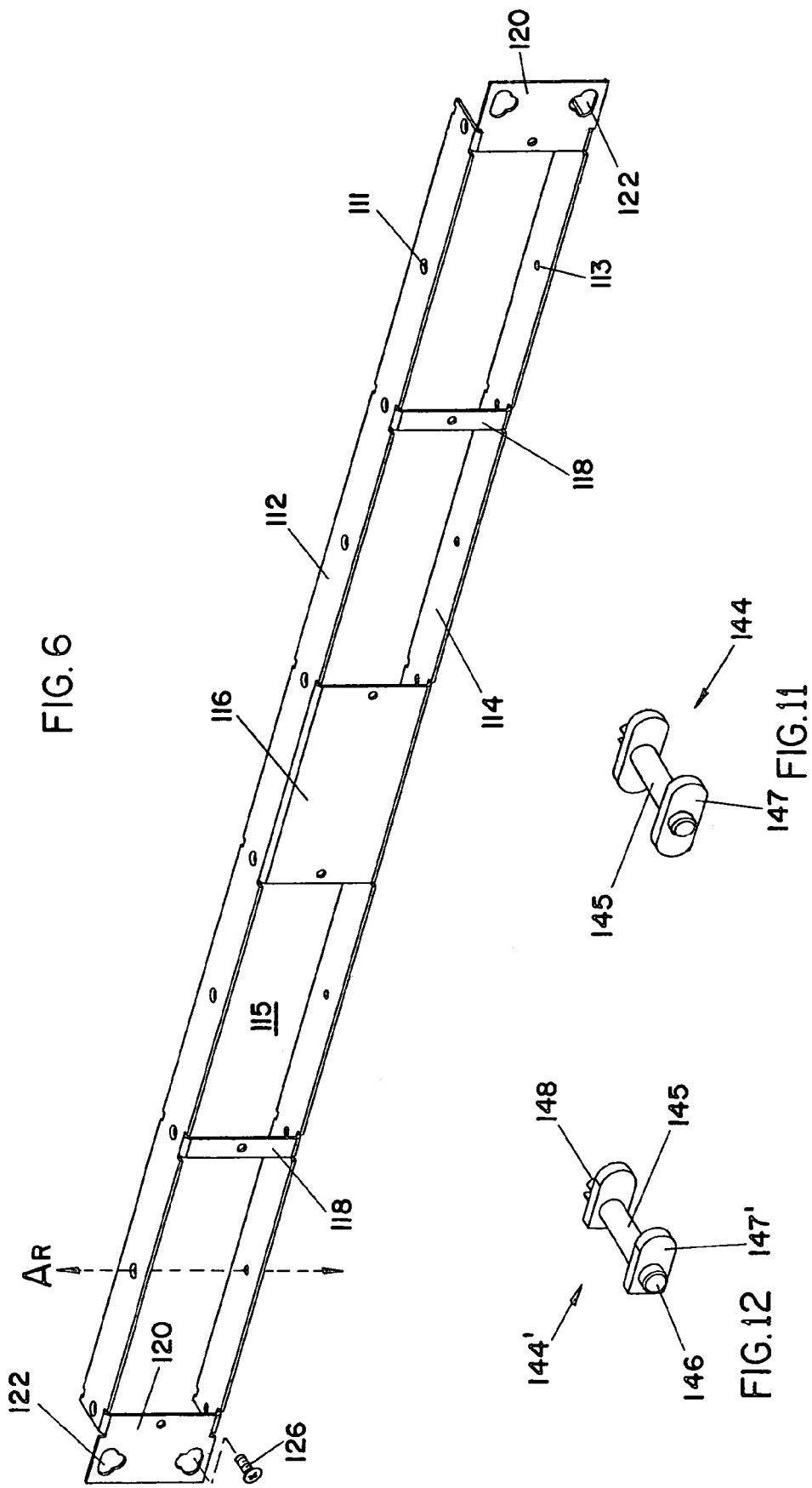

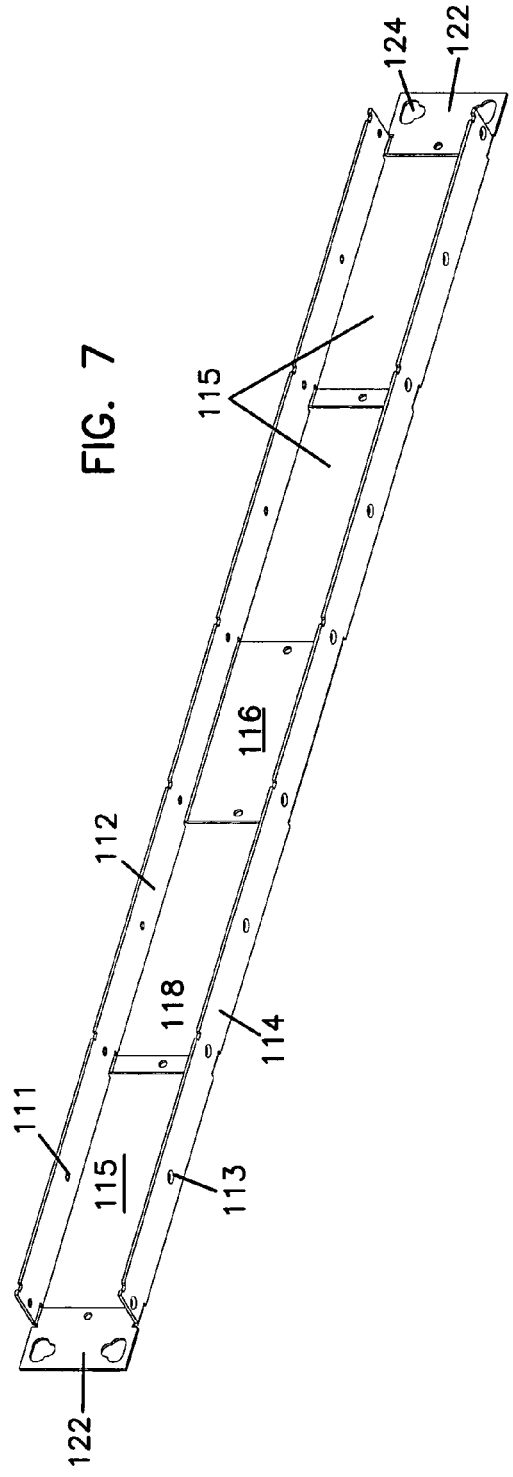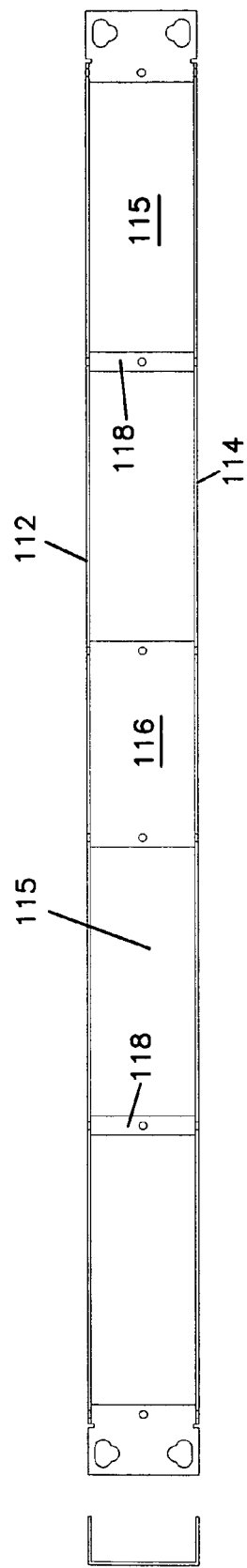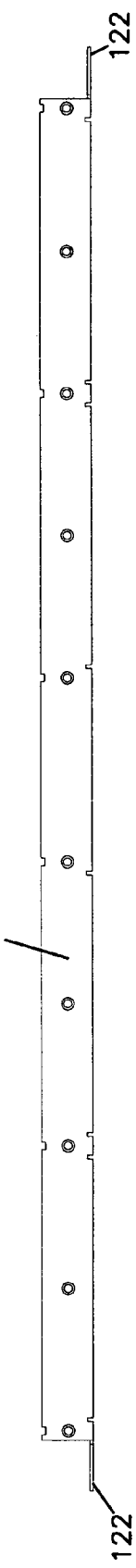

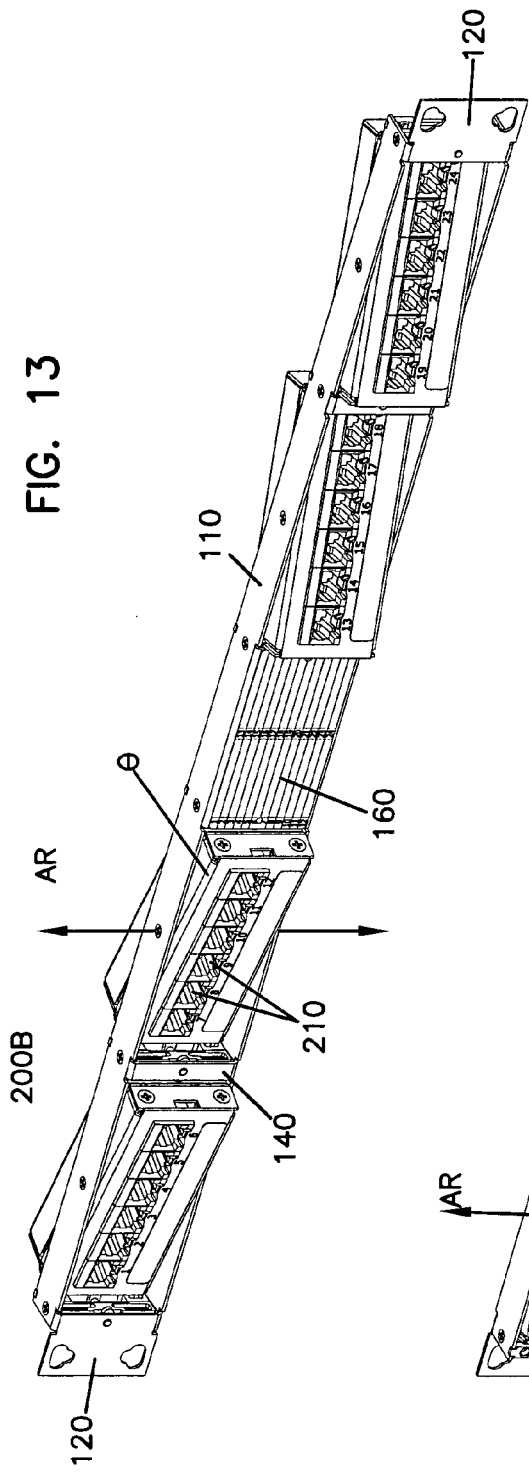
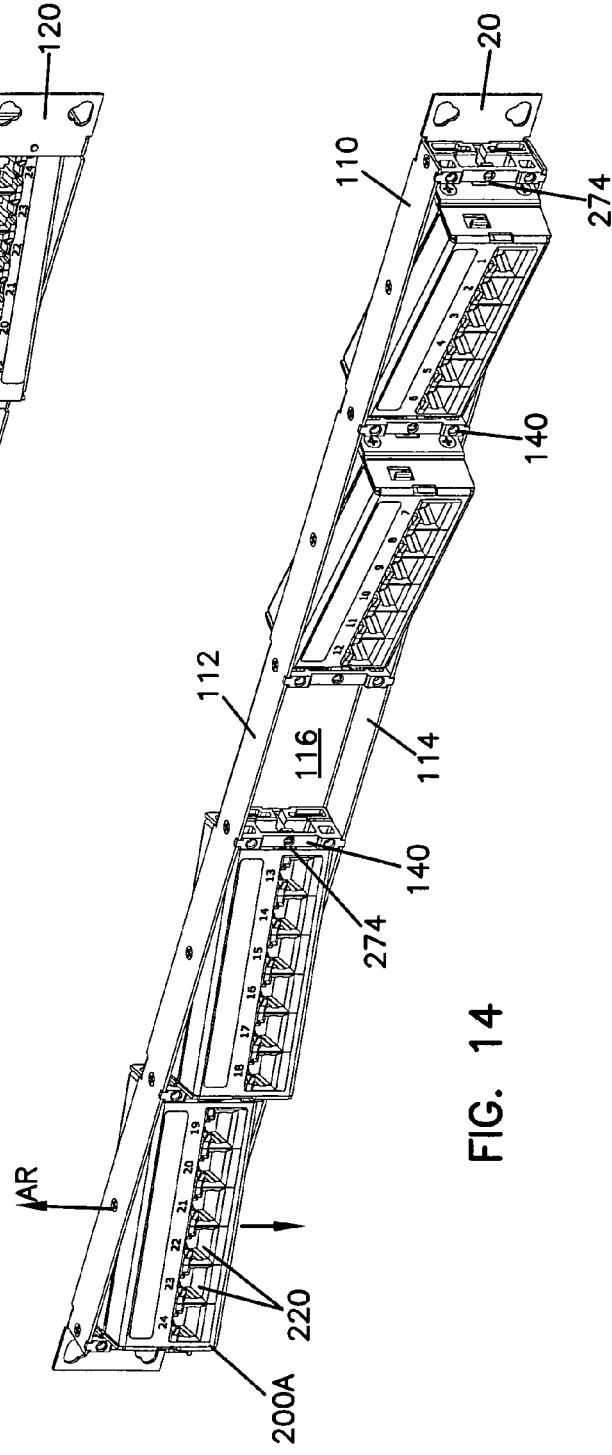

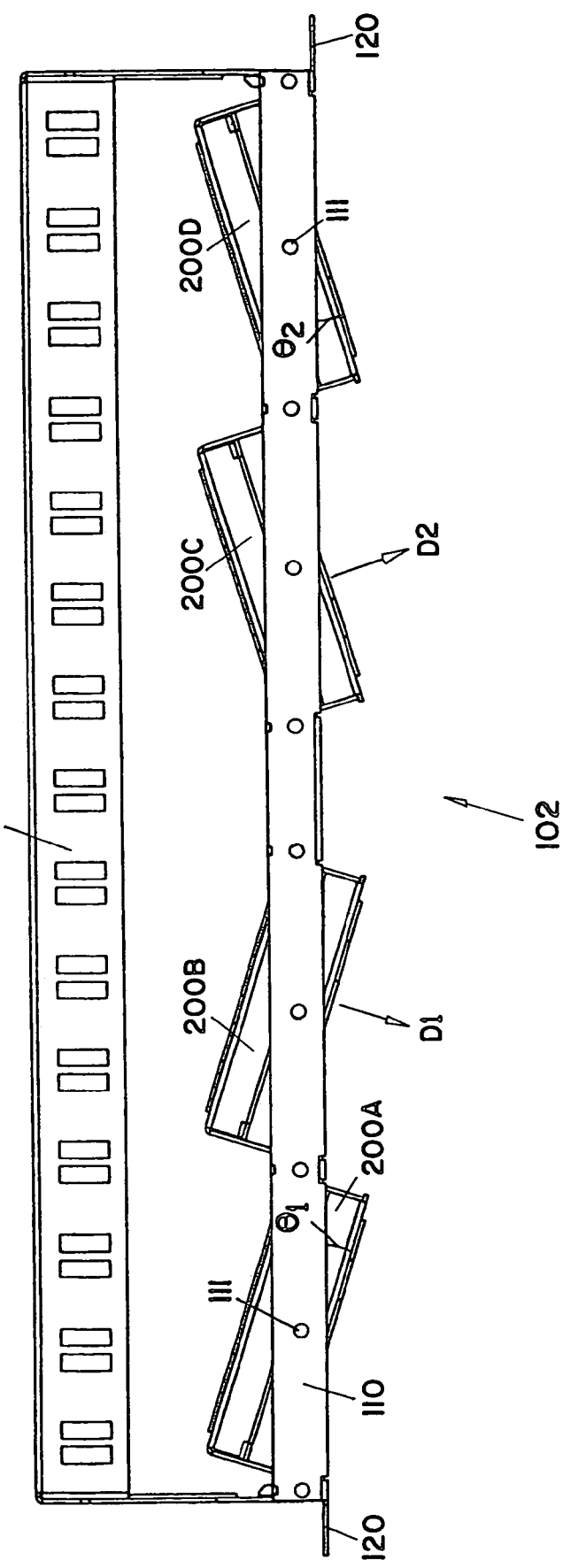

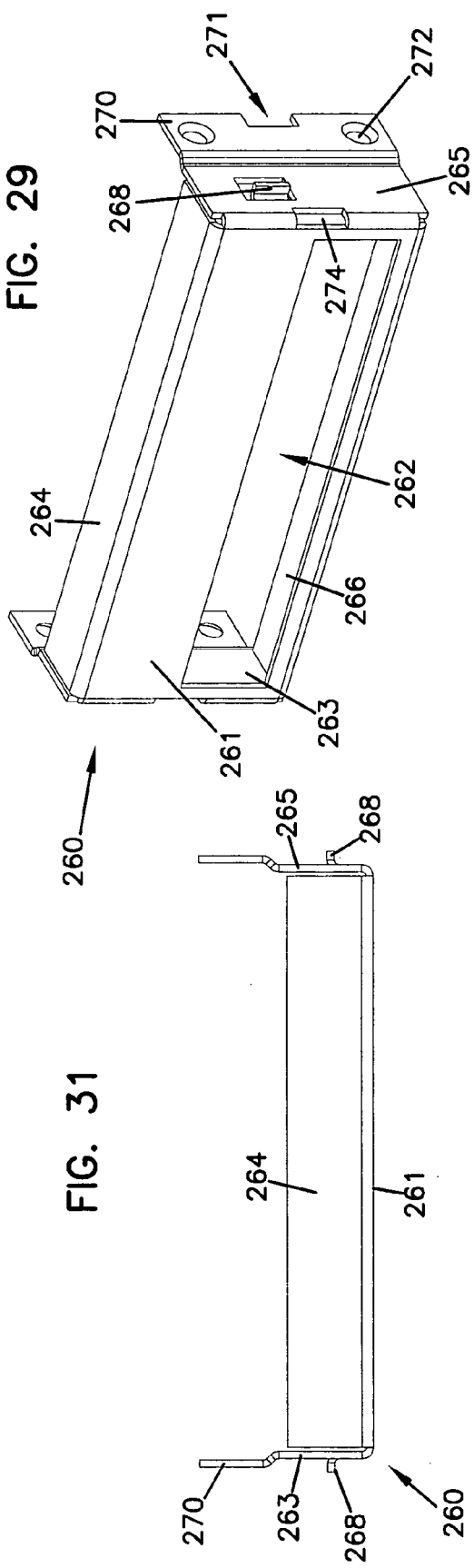
FIG. 29
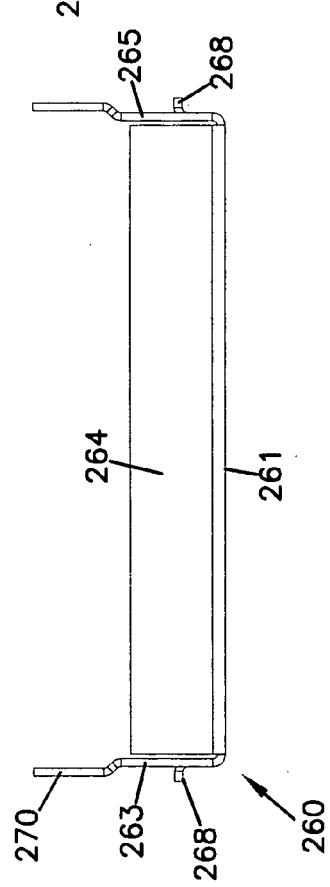
FIG. 31
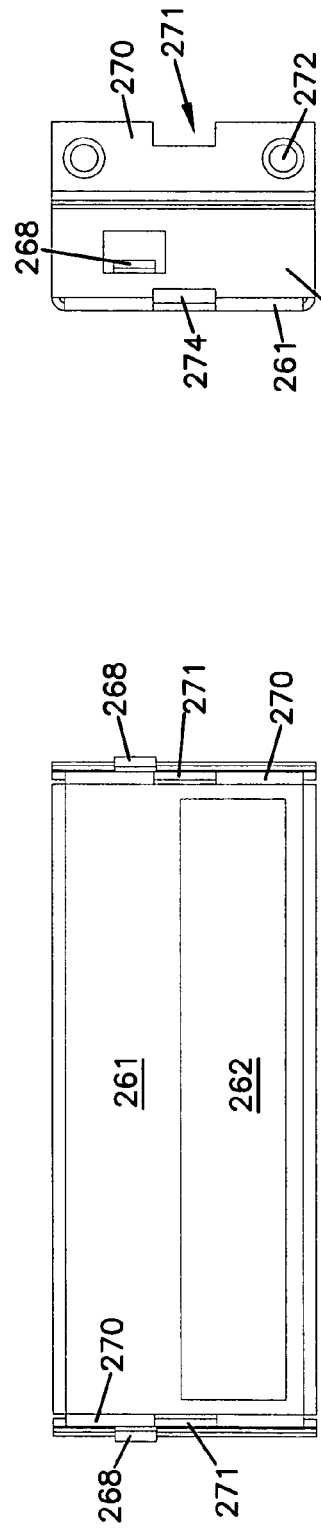
FIG. 32
FIG. 30

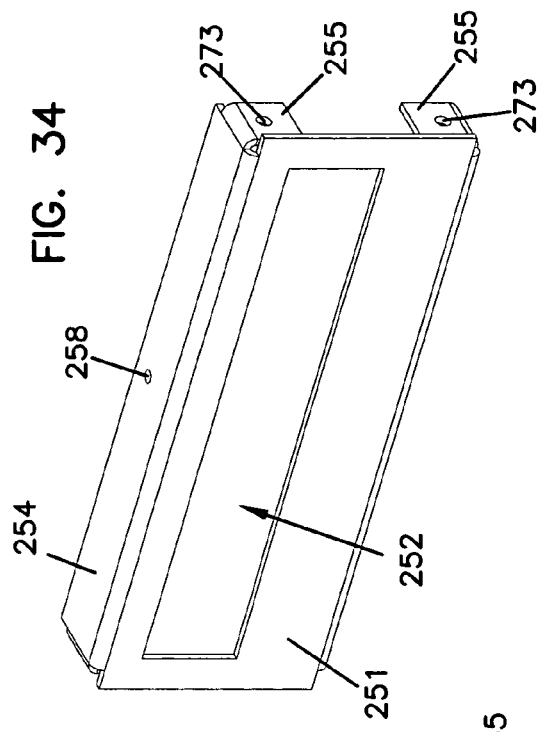
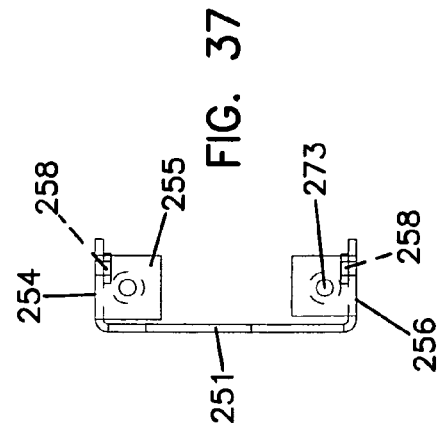
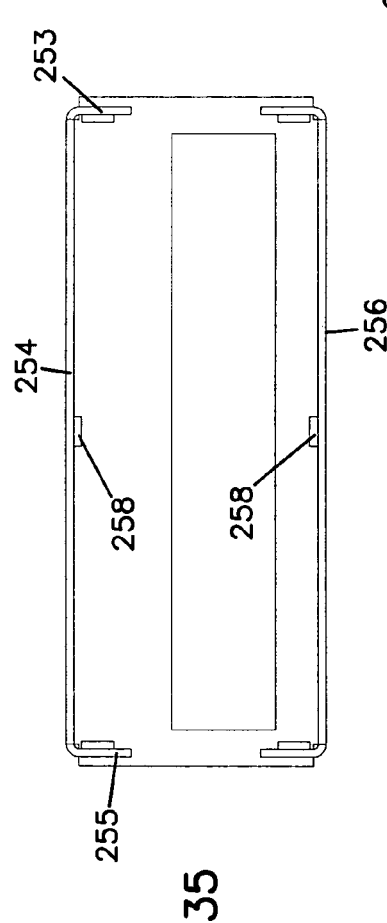
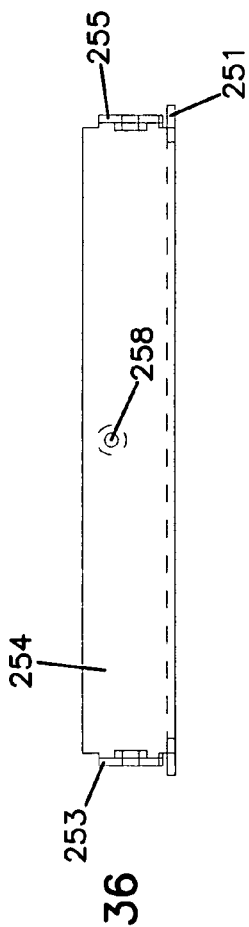
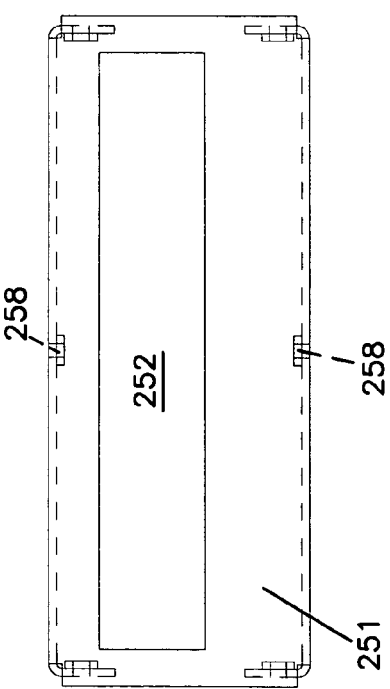

FIG. 39
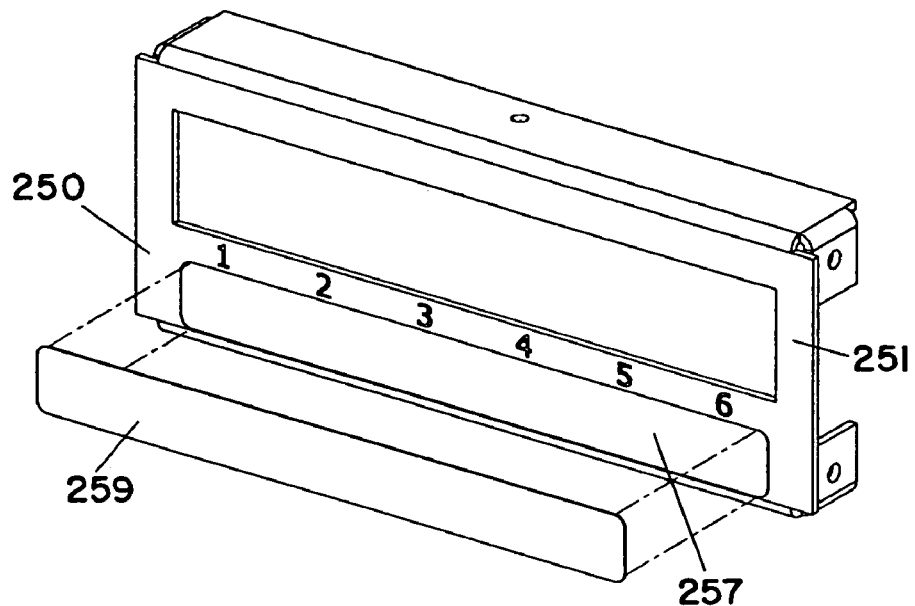
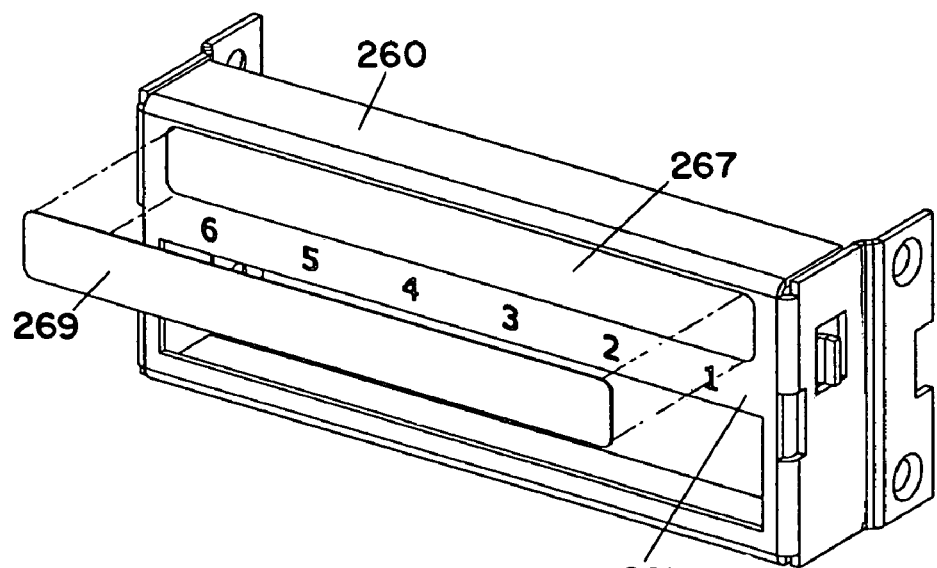
FIG. 40

RJ TO RJ SWING PANEL

TECHNICAL FIELD

The present invention relates to a telecommunications connection panel. More particularly, the present invention relates to a telecommunications cross-connection patch panel with connectors on both sides of the panel.

BACKGROUND

Local area networks and telecommunications connections often use patch panels, especially at customers premises to enable quick and convenient cross-connection between telecommunications equipment. Twisted pair communications cable is often used to link telecommunications devices to these patch panels, with each cable including four twisted pairs or eight total individual wires.

Front connectors on these patch panels typically have jacks to receive plug-type connectors, such as RJ-45 connectors. Such front connectors allow for easy connection and disconnection between telecommunications equipment electronically connected to the same patch panel or to patch panels located in relatively close proximity to one another. These front connectors are mounted to a circuit board within the panel and accessed through a faceplate of the panel. These connectors are typically mounted so that the outermost surface of the connector is flush with the faceplate and the remainder of the connector and the circuit board is housed within the panel. The circuit boards are mounted to the rear of the faceplate with screws and stand-offs to provide the offset spacing so that the connector is properly positioned relative to the faceplate. Patch panels assembled in this fashion include a high part count, are expensive to manufacture and are difficult to service. Improvements to the mounting and positioning of front connectors in telecommunications patch panels are desirable.

Often, the rear connectors on a patch panel are more permanent types of connectors, such as insulation displacement connectors or wire wrap connectors. These types of connectors are suitable for permanent or semi-permanent connection. However, the quality of the electrical connection made with such a connector can vary with the skill level of the person assembling the panel and the environment in which the panel is mounted. Furthermore, permanent type connectors can be complicated or time consuming to install. Improvement to the rear connectors of telecommunication patch panels is desirable.

SUMMARY

One aspect of the present disclosure relates to a telecommunications patch panel assembly including connector modules that are pivotally connected to a frame of the assembly. Each connector module includes a housing enclosing a circuit board, front connector ports mounted to one side of the circuit board, and rear connector ports mounted to the other side of the circuit board. The connector modules can pivot from a closed position wherein the connector modules are aligned parallel with the frame, and one or more open angled positions wherein the connector modules are positioned at angled positions relative to the frame.

A variety of examples of desirable product features or methods are set forth in part in the description that follows, and in part will be apparent from the description, or can be learned by practicing various aspects of the disclosure. The aspects of the disclosure can relate to individual features as well as combinations of features. It is to be understood that both the foregoing general description and the following detailed description are explanatory only, and are not restrictive of the claimed invention.

BRIEF DESCRIPTION OF THE DRAWINGS

The accompanying drawings, which are incorporated in and constitute a part of the description, illustrate several aspects of the present invention and together with the description, serve to explain several aspects of the invention. A brief description of the drawings is as follows:

FIG. 1 is a front perspective view of a telecommunications patch panel assembly according to one embodiment of the present disclosure;

FIG. 2 is a rear perspective view of the telecommunications patch panel assembly of FIG. 1;

FIG. 6 is a front perspective view of the frame of the telecommunications patch panel assembly of FIG. 1 with the connection modules removed;

FIG. 7 is a rear perspective view of the frame of FIG. 6;

FIG. 8 is a front view of the frame of FIG. 6;

FIG. 9 is a top view of the frame of FIG. 6;

FIG. 11 is a front perspective view of a first type of locking pin according to one embodiment of the present disclosure;

FIG. 12 is a front perspective view of a second type of locking pin according to another embodiment of the present disclosure;

FIG. 13 is a front perspective view of the telecommunications patch panel assembly of FIG. 1 with the connection modules arranged in angled positions in accordance with one embodiment of the present disclosure;

FIG. 14 is a rear perspective view of the telecommunications patch panel assembly of FIG. 13;

FIG. 15 is a top view of the telecommunications patch panel assembly of FIG. 13;

FIG. 29 is a front perspective view of a rear housing shell according to one embodiment of the present disclosure;

FIG. 30 is a rear view of the rear housing shell of FIG. 29;

FIG. 31 is a top view of the rear housing shell of FIG. 29;

FIG. 32 is a side view of the rear housing shell of FIG. 29;

FIG. 34 is a front perspective view of the front housing shell according to one embodiment of the present disclosure;

FIG. 35 is a rear view of the front housing shell of FIG. 34;

FIG. 36 is a top view of the front housing shell of FIG. 34;

FIG. 37 is a side view of the front housing shell of FIG. 34;

FIG. 38 is a front view of the front housing shell of FIG. 34;

FIG. 39 is a front perspective view of an indicia strip exploded from the front housing shell of FIG. 34; and FIG. 40 is a front perspective view of an indicia strip exploded from the rear housing shell of FIG. 29.

DETAILED DESCRIPTION

Figure 3:
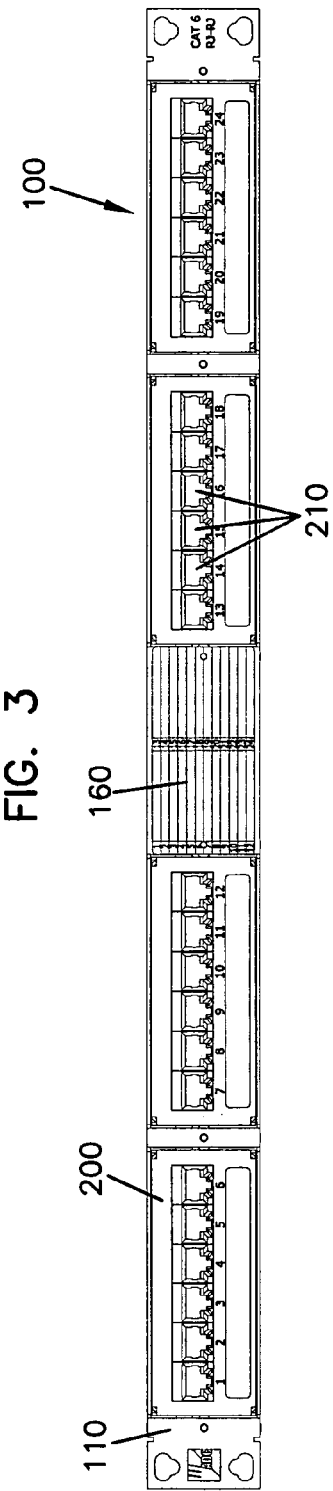
FIG. 3 is a front view of the telecommunications patch panel assembly of FIG. 1.
Figure 4:
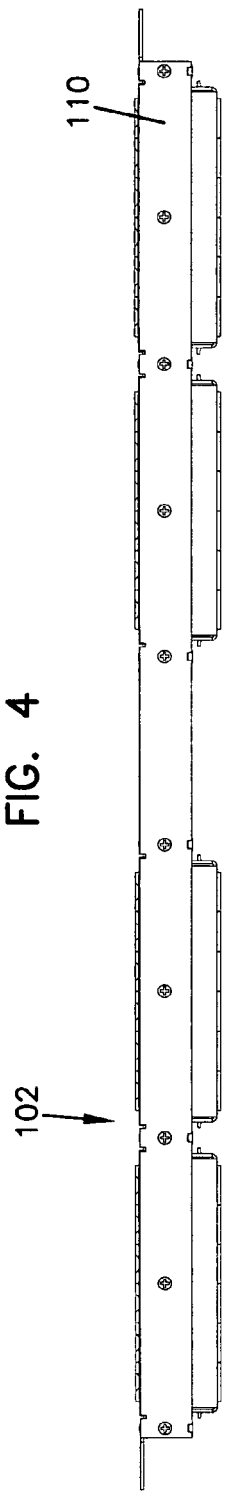
FIG. 4 is a bottom view of the telecommunications patch panel assembly of FIG. 1.
Figure 5:
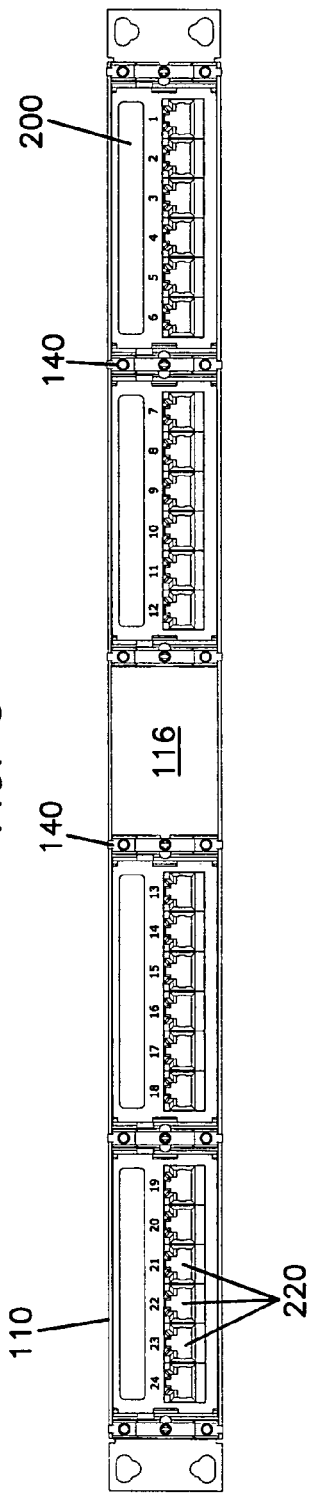
FIG. 5 is a rear view of the telecommunications patch panel assembly of FIG. 1.

Reference will now be made in detail to various features of the present disclosure that are illustrated in the accompanying drawings. The present disclosure relates to telecommunications patch panels, and more particularly relates to patch panel assemblies that include connection modules that are pivotally connected to a frame of the assembly. The connection modules include connector ports on opposite sides of a printed circuit board. Each connection module is mounted to be pivotable relative to the frame. The modules include a connector port geometry that facilitates access to the ports and reduces bend angles for cables coupled to the connector ports.

Referring now to FIGS. 1-5, a telecommunications patch panel 100 including a frame 110 and four connection modules 200 is shown. Each connection module 200 includes one or more front ports 210 (FIG. 1) and an equal number of rear ports 220 (FIG. 2). In the example shown, each connection module 200 includes six front ports 210, shown as jack ports, and six rear ports 220, shown as jack ports, providing a total of twenty-four jack ports each on the front and rear sides 102, 104, respectively, of the patch panel assembly 100. In other embodiments, however, the patch panel assembly 100 can include greater or fewer connection modules 200 and each connection module 200 can include greater or fewer connector ports 210, 220.

Referring to FIGS. 6-9, the frame 110 generally includes a top portion 112 and an opposing bottom portion 114. End brackets 120 extend between the top and bottom portions 112, 114 to form at least one opening 115. Each opening 115 is configured to receive at least one connection module 200. In certain embodiments, a panel 116 and intermediate brackets 118 can also extend between top and bottom potions 112, 114 to form multiple openings 115.

As shown in FIG. 1, the end brackets 120 include rack mounting holes 122 to enable the frame 110 to mount to a rack of conventional construction (e.g., partial rack as shown in FIG. 1 at 121). In one embodiment, the patch panel assembly 100 can mount to such a rack 121 with fasteners 126 passing through holes 122 of the end brackets 120 for receipt into holes 124 of the rack 121.

Figure 10:
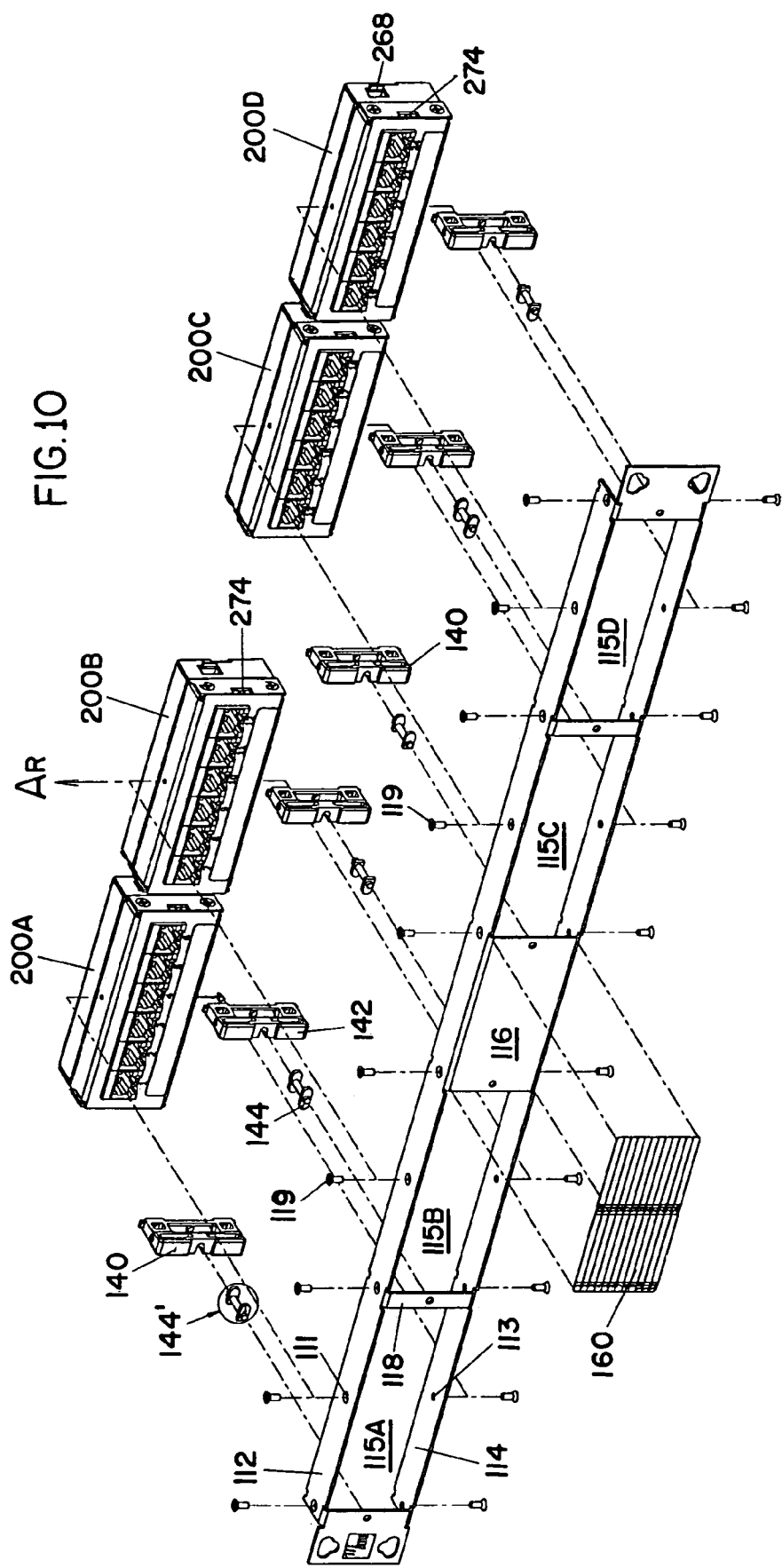
FIG. 10 is an exploded, front perspective view of the telecommunications assembly of FIG. 1.

As shown in FIG. 10, one or more connection modules 200 can be mounted within the linear array of openings 115 of the frame 110. In the example shown, four connection modules 200A, 200B, 200C, and 200D are being mounted in openings 115A, 115B, 115C, and 115D, respectively. Locks 140 are mounted to the frame 110 behind the end brackets 120, intermediate brackets 118, and the panel 116. Further details with respect to the locks 140 will be described herein with reference to FIGS. 11 and 12.

In certain embodiments, the connection modules 200 can be rotatably mounted to the frame 110 of the patch panel assembly 100. In general, each connection module 200 defines an axis of rotation $A_R$ about which the connection module 200 can rotate relative to the frame 110. In general, the axis of rotation $A_R$ extends parallel to the front side 102 of the frame 110 and extends transversely relative to the linear array of openings 115. The top and bottom potions 112, 114 of the frame 110 define openings 111, 113, respectively, through which a pin 119 or other fastener can pass to couple each connection module 200 to the frame 110. The pin 119 extends along the axis of rotation $A_R$.

When so mounted to the frame 110, each connection module 200 can be rotated into one of multiple positions about the axis $A_R$. In certain embodiments, each connection module 200 can be rotated to one of three positions. In the first position, the front connector ports 210 of the connection module 200 extend parallel to the front side 102 of the frame 110 and the rear connector ports 220 extend parallel to the rear side 104 of the frame 110 (e.g., see FIGS. 1-5).

In the second position, however, the front connector ports 210 extend at an angle $\theta_1$ (e.g., see FIG. 15) relative to the front side 102 of the frame 110. In the third position, the front connector ports 210 extends at a second angle $\theta_2$ (e.g., see FIG. 15) relative to the frame 110. The front connectors 210 face a first direction D1 when in the second position and face a second direction D2 when in the third position (e.g., see FIG. 15).

In some embodiments, the connection modules 200 can be rotated to face in the same direction. In other embodiments, however, each of the connection modules 200 can be rotated to face in different directions. For example, as shown in FIG. 15, connection modules 200A, 200B can be rotated in the first direction D1, and connection modules 200C, 200D can be rotated in the second direction D2.

In a preferred embodiment, the angle of displacement $\theta_1$, $\theta_2$ of each connection module 200 relative to frame 110 is about ten degrees (10°) to about 45 degrees (25°), and more preferably about fifteen degrees (15°).

In a preferred embodiment, each connection module 200 includes outwardly facing stops 268 (e.g., see FIGS. 29-32) on each side that limit the amount by which the connection module 200 can be rotated during use. Each stop 268 is configured to engage one edge of a bracket 142 (FIG. 10) mounted to the frame 110 so as to limit the rotation of the connection module 200 to approximately plus or minus fifteen degrees (15°) in the preferred embodiment. Such an angle can provide strain relief so as to help prevent cable damage and/or loss of cable performance. The cable positioning provided by angling connection modules 200 helps reduce the likelihood of falling below the minimum bend radius of the cable as each cable travels to other jacks or other equipment. Such strain relief is advantageous over a perpendicular mounting of the connector plug relative to the cable pathway, Referring back to FIG. 10, each connection module 200 can be retained in a desired position with respect to the frame 110 using the lock 140, shown generally in FIG. 10. The lock 140 can be released to allow rotation of each connection module 200 as desired. To maintain each of the connection modules 200 in a position, the lock 140 is then reactivated. In other embodiments, however, one or more of the connection modules 200 can be constructed in a permanently angled configuration relative to the front face 102 of the frame 110.

The lock 140 is a preferred feature for the patch panel assembly 100. However, a patch panel assembly 100 where the lock 140 is not activated, or a patch panel assembly 100 where no lock is present are both advantageous arrangements. In those instances, each connection module 200 is positionable to the left (fully or partially), to the right (fully or partially) or parallel as desired. For such connection modules 200 which are freely rotatable, the modules 200 may move to a new position from an original position to provide strain relief as patch cords are added or changed.

In certain embodiments, each lock 140 includes a bracket 142 mounted to the frame 110 and a locking pin 144 mounted to the bracket 142. Each locking pin 144 includes a shaft 145 having a first tool engageable end 148 and an opposite end 146 (FIGS. 11 and 12). Each locking pin 144 also includes two spaced apart tabs (FIGS. 11 and 12). When the brackets 142 are mounted to the frame 110, the locking pins 144 are rotatable between an unlocked position, and a locked position.

The locked position of a locking pin 144 is shown in the FIG. 10. The tabs 147 extend outwardly from the shaft 145 and protrude into detents 274 defined in the sides of the connection modules 200 (e.g., see FIG. 14). Moving the locking pins 144 to the unlocked position includes rotating the shaft 145 approximately ninety degrees (90°) about its longitudinal axis to rotate the tabs 147 out of engagement with the detents 274. For example, the shaft 145 can be rotated using a flathead or Phillips screwdriver received in the tool engageable end 148.

In certain embodiments, locks 140 can include a particular type of locking pin 144 depending on where each lock 140 attaches to the frame 110. For example, a first type of locking pin, shown in FIG. 11 at 144, includes tabs 147 having two ends extending in opposite directions from the shaft 145. Such a locking pin 144 is preferably used in locks 140 positioned between first and second connection modules 200 (e.g., see FIG. 10). The first end of each tab 147 can engage with a detent 274 on the first connection module and the second end of each tab 147 engages with a detent 274 on the second connection module.

A second type of locking pin, shown in FIG. 12 at 144', includes tabs 147' having a first end terminating adjacent the shaft 145 and a second end extending outwardly from the shaft 145. Such a locking pin 144' is preferably used in locks 140 positioned adjacent only one connection module 200 (e.g., see FIG. 10). Further details regarding the lock 140 can be found in U.S. Pat. No. 6,537,106, issued Mar. 25, 2003, and entitled "TELECOMMUNICATIONS PATCH PANEL WITH ANGLED CONNECTOR MODULES," the disclosure of which is hereby incorporated by reference.

Figure 16:
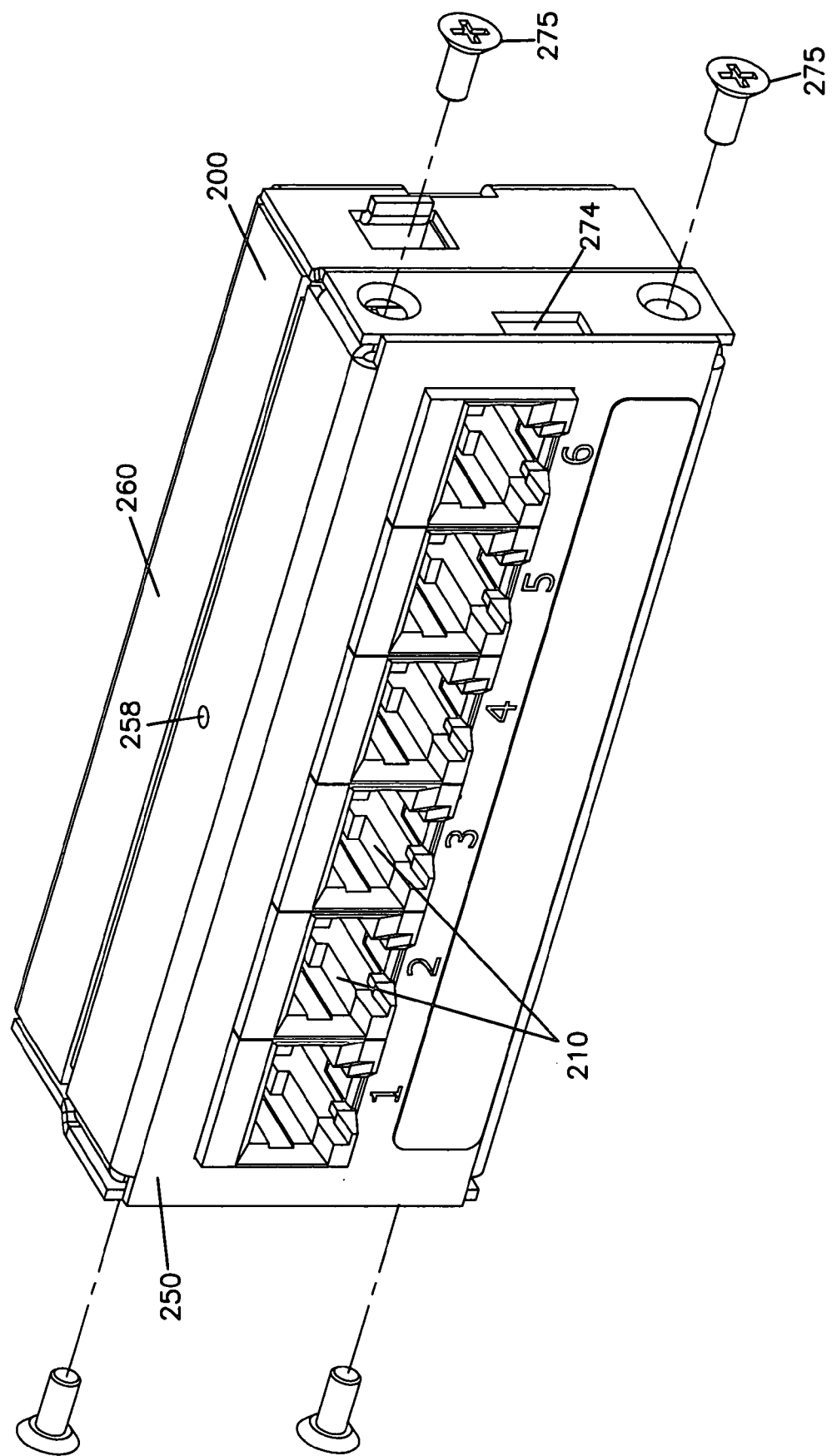
FIG. 16 is a front, perspective, partially exploded view of one of the connection modules of FIG. 1 according to one embodiment of the present disclosure.
Figure 24:
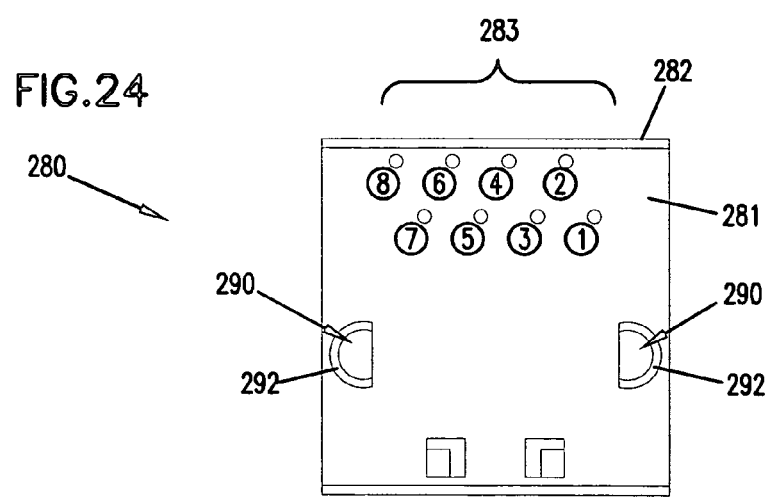
FIG. 24 is a rear view of the jack port of FIG. 19.
Figure 25:
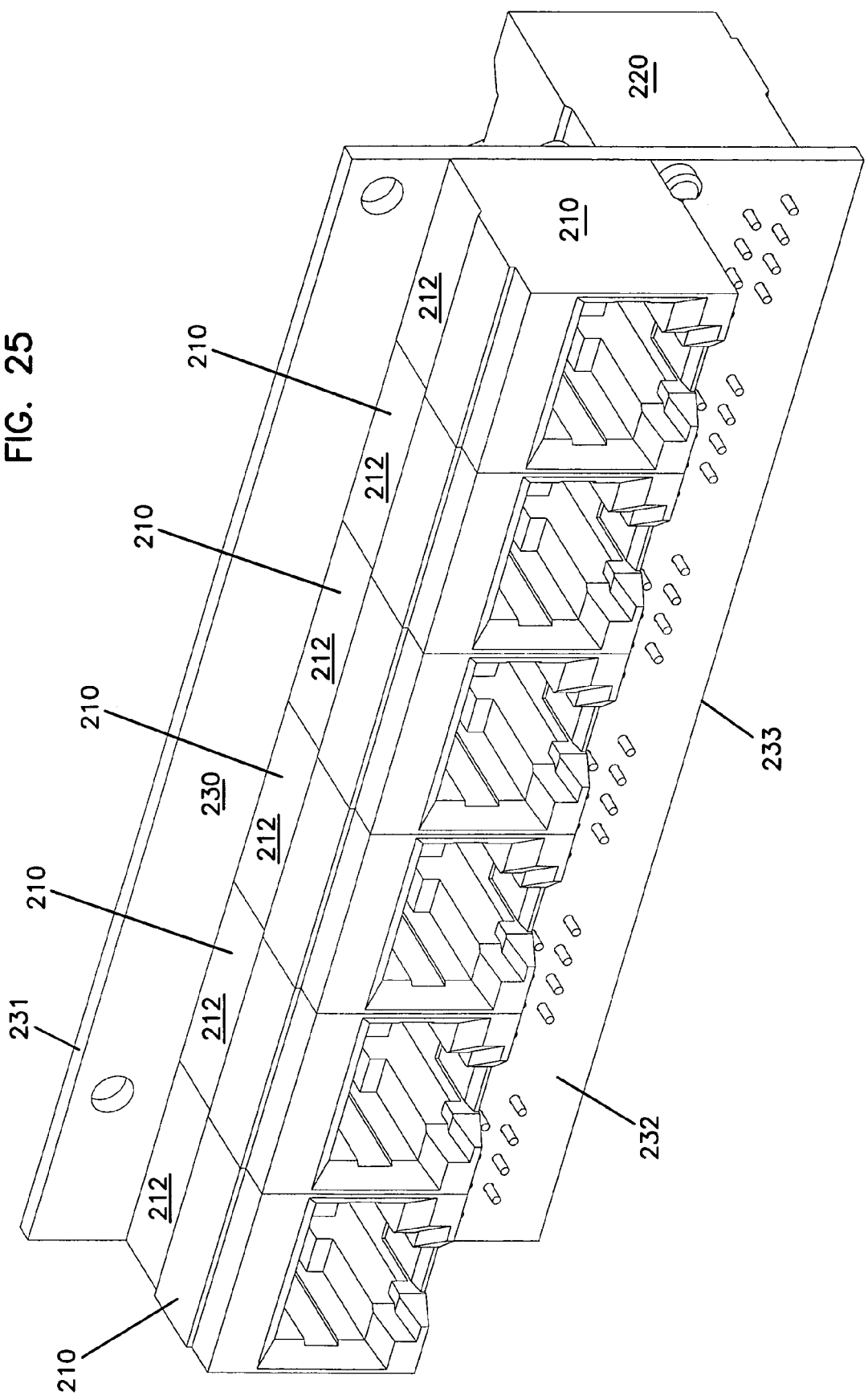
FIG. 25 is a front perspective view of the circuit board and connector ports of FIG. 17 after the front and rear connector ports have been mounted to the circuit board.
Figure 26:
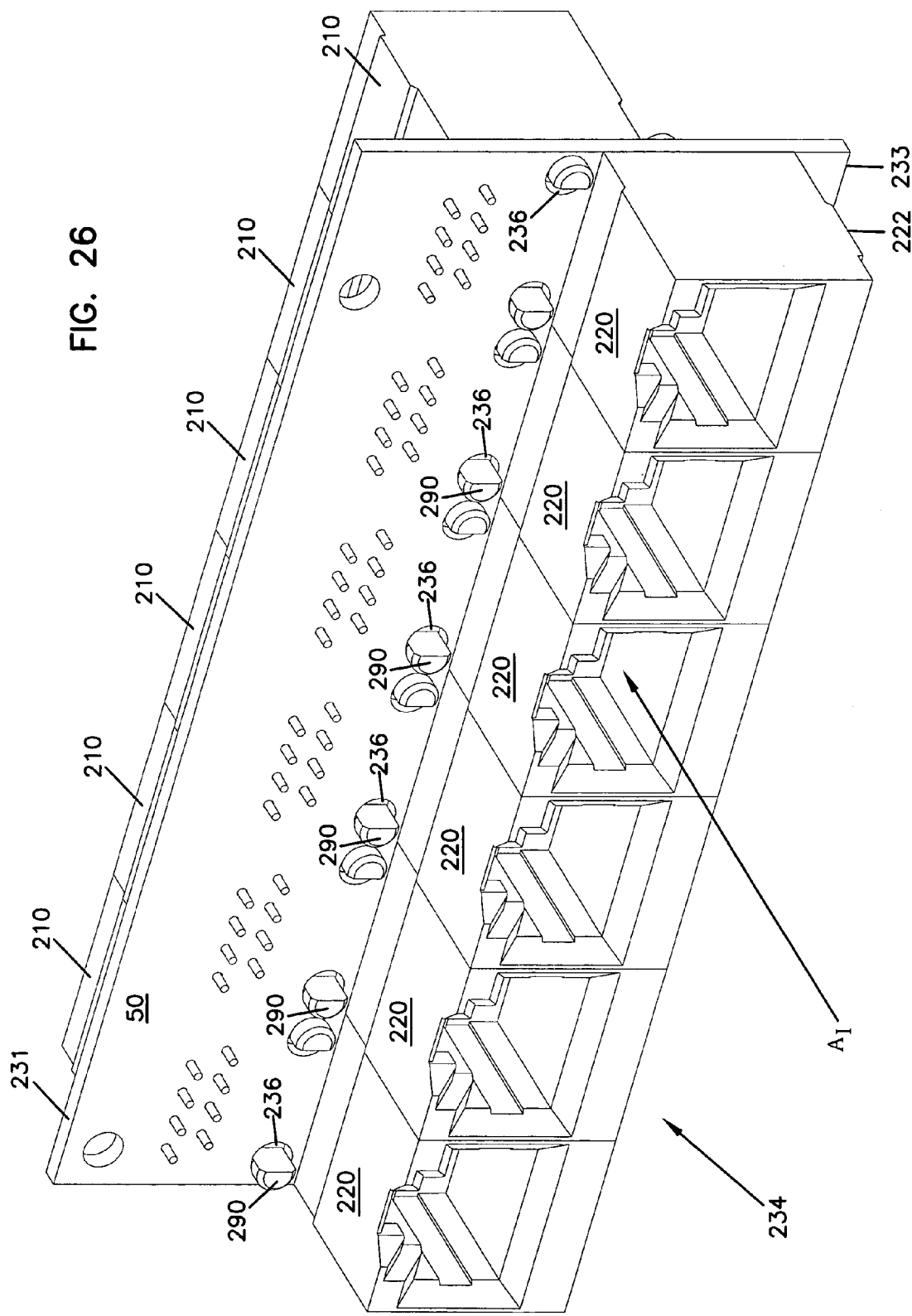
FIG. 26 is a rear perspective view of the circuit board and connector ports of FIG. 25.
Figure 27:
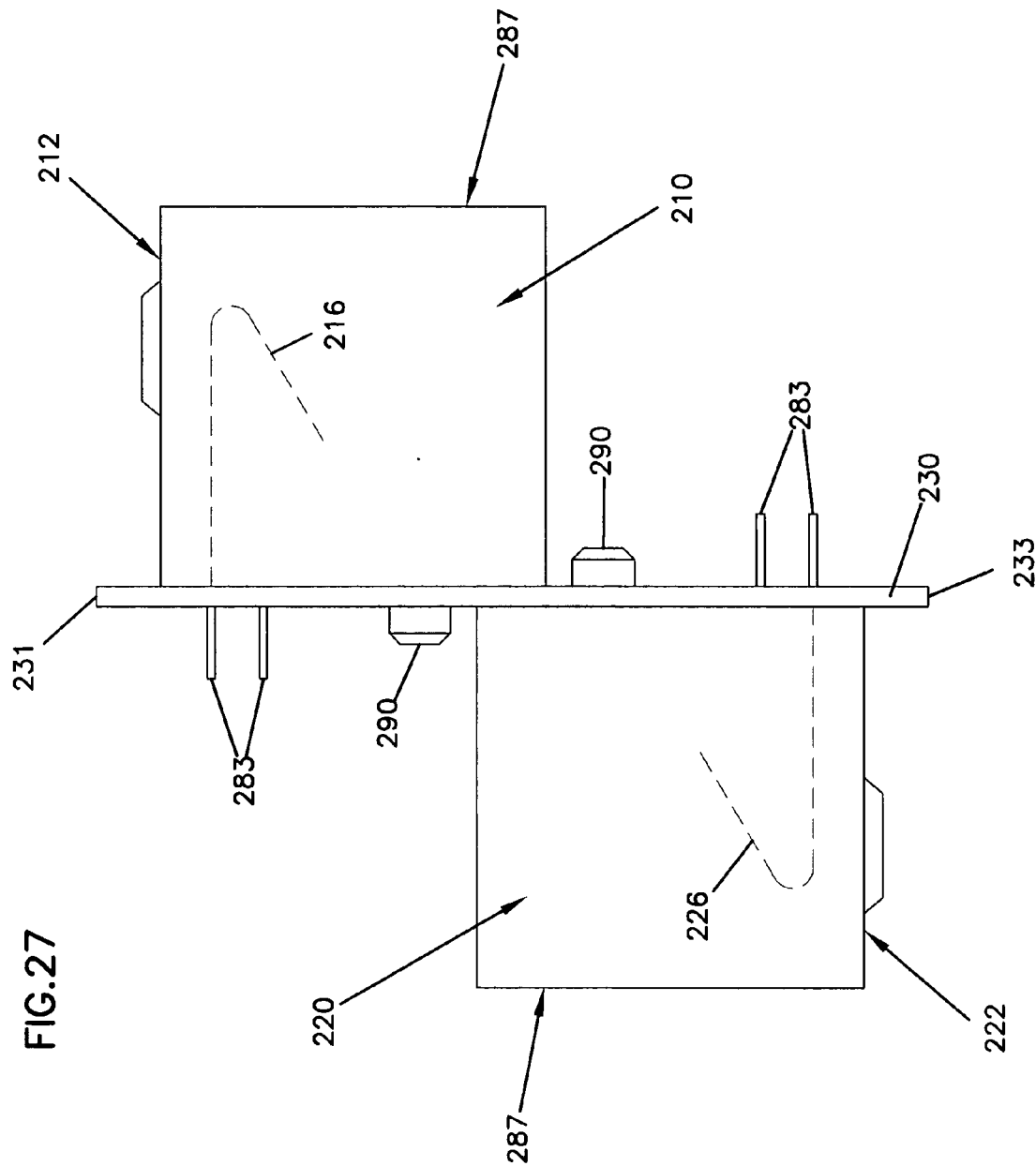
FIG. 27 is a side view of the circuit board and connector ports of FIG. 25.
Figure 28:
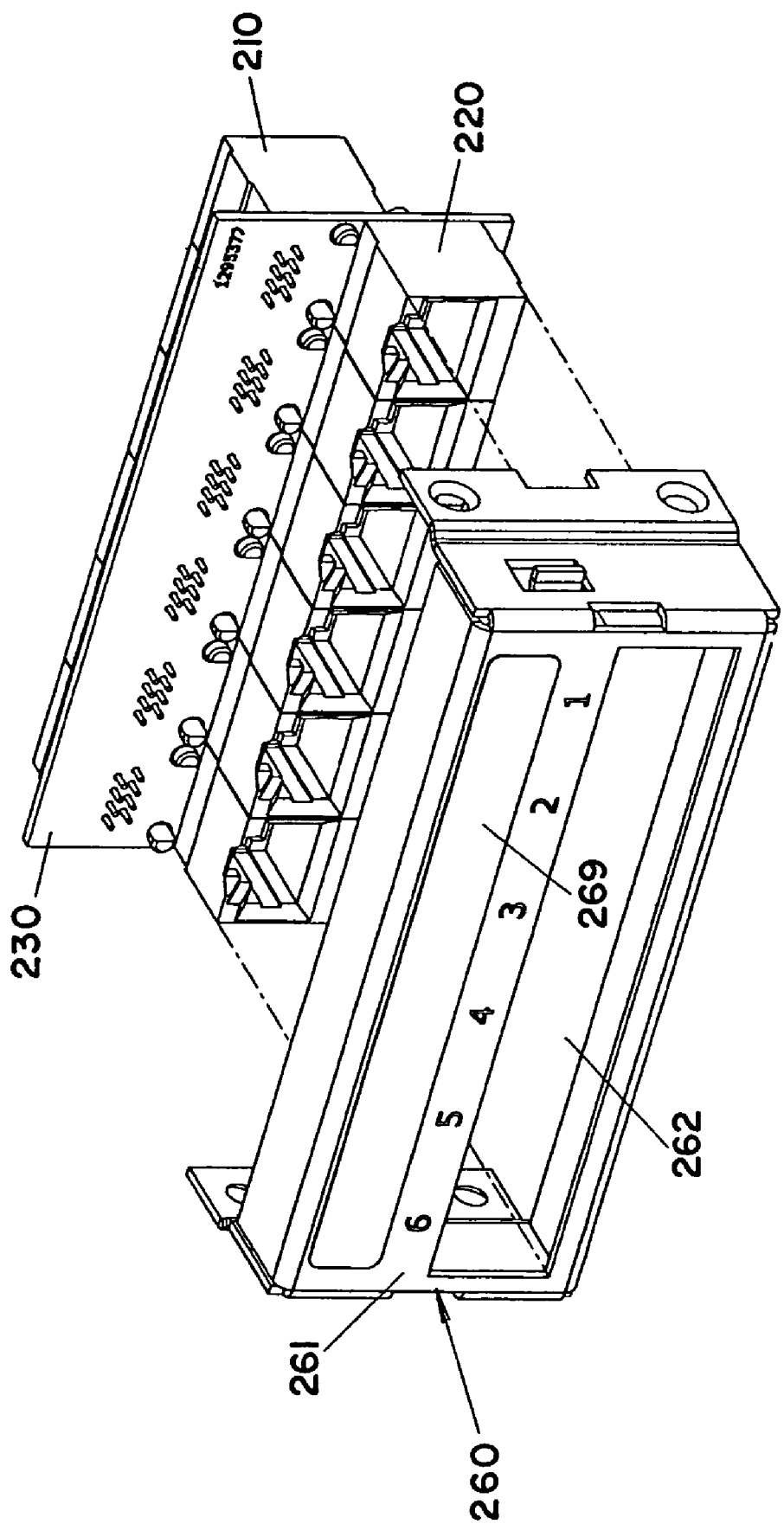
FIG. 28 is a front perspective view of a rear housing shell exploded from the circuit board and connector ports of FIG. 25.

Referring now to FIGS. 16-40, each connection module 200 includes multiple front connector ports 210 and an equal number of rear connector ports 220 extending from opposite sides of a printed circuit board 230 (e.g., see FIGS. 25-27). A first housing shell 250 (FIG. 16) covers a first side 232 (FIG. 25) of the printed circuit board 230 and a second housing shell 260 (FIG. 28) covers a second side 234 (FIG. 18) of the printed circuit board 230. The printed circuit board 230 is generally pinched or captured between the first and second housing shells 250, 260.

In general, the housing shells 250, 260 provide a degree of protection to the circuit board 230 and the connector ports 210, 220 to inhibit accidental contact or intrusion that may damage one of these items. In some embodiments, the housing shells 250, 260 can be secured together with screws 275 (FIG. 16) or other such fasteners. In other embodiments, the housing shells 250, 260 can be secured together about the circuit board 230 using adhesive, a snap-fit connection, or any other desired securement means.

Figure 17:
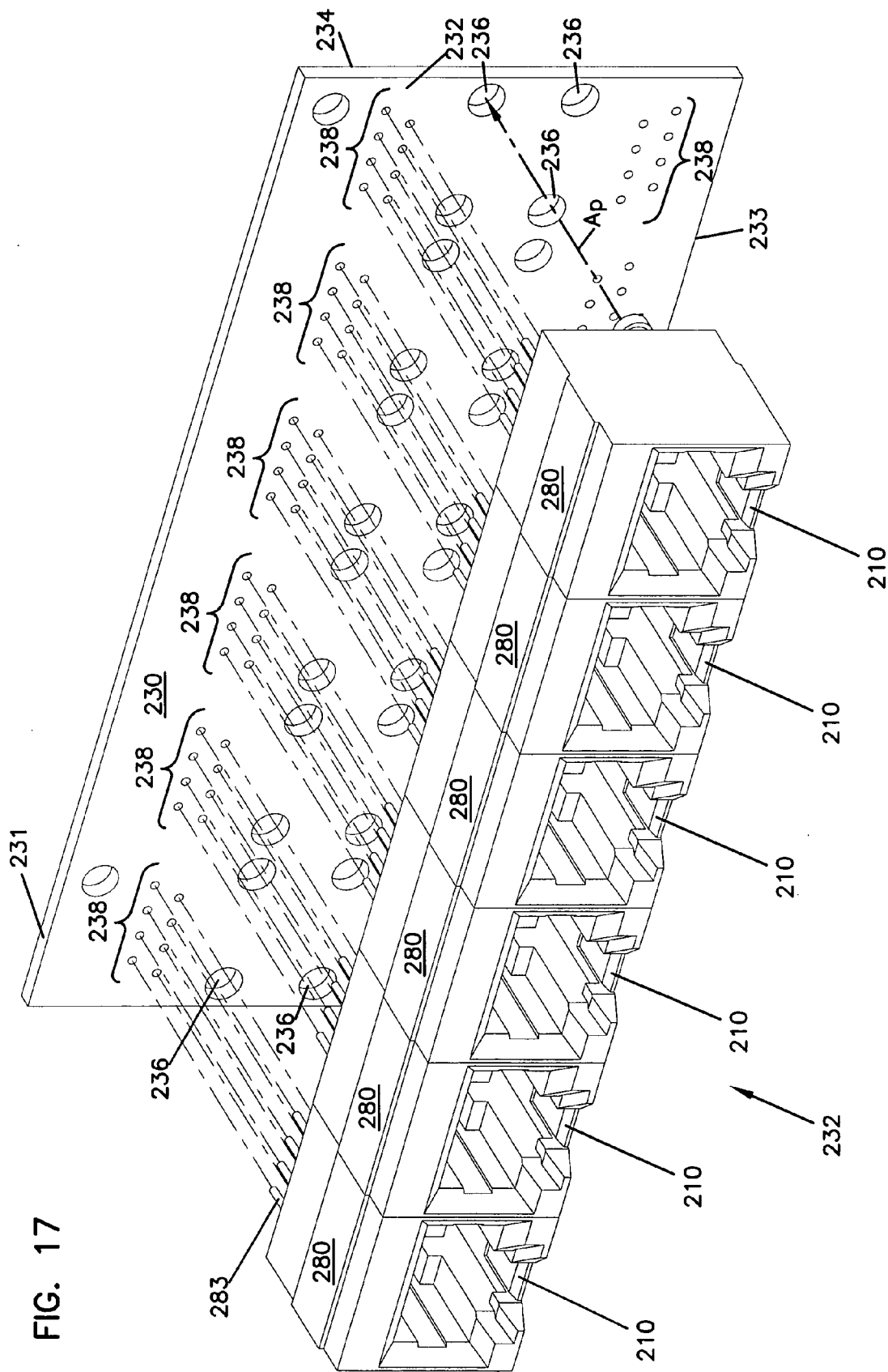
FIG. 17 is a front perspective view of the front connector ports of a connection module exploded from a circuit board of the connection module according to one embodiment of the present disclosure.
Figure 18:
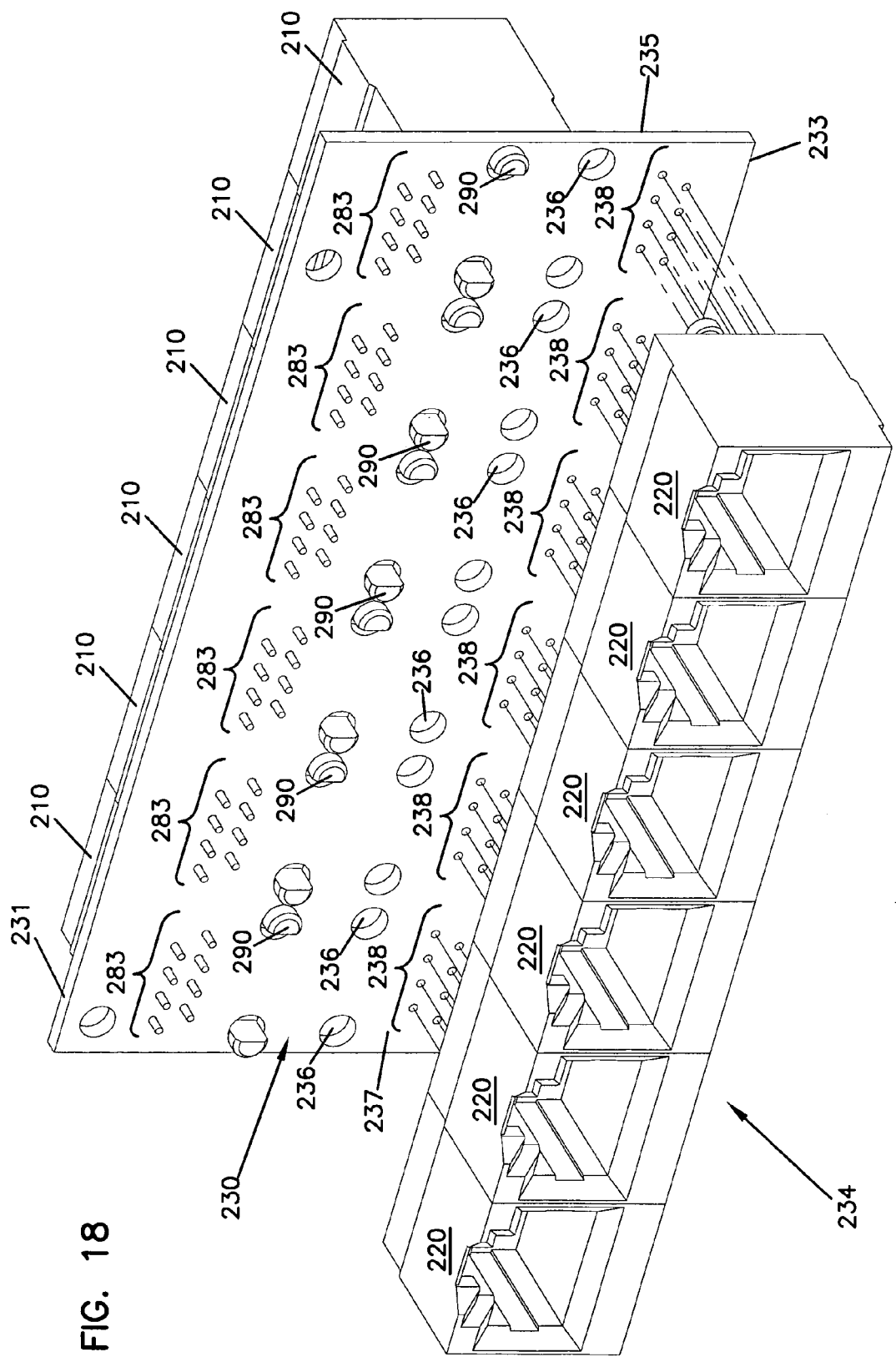
FIG. 18 is a rear perspective view of rear connector ports exploded from the circuit board of FIG. 17 after the front connector ports have been attached to the circuit board.
Figure 19:
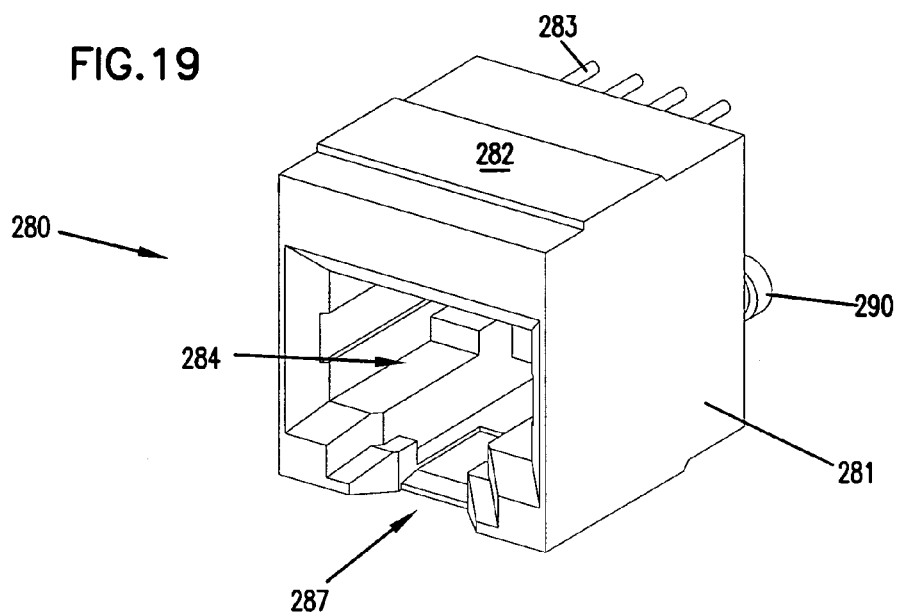
FIG. 19 is a front perspective view of a jack port according to one embodiment of the present disclosure.
Figure 20:
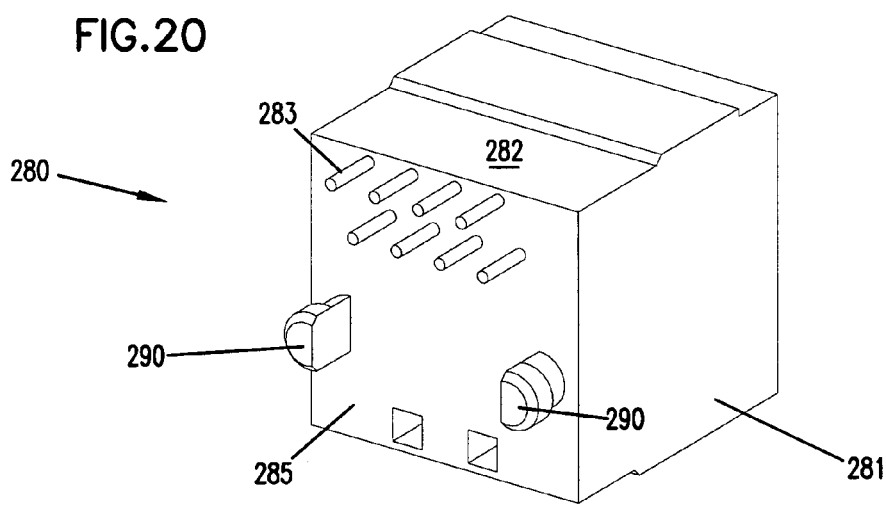
FIG. 20 is a rear perspective view of the jack port of FIG. 19.
Figure 21:
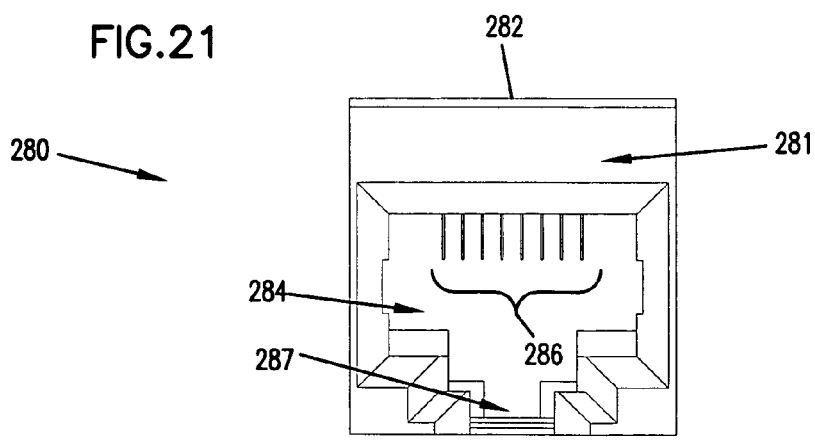
FIG. 21 is a front view of the jack port of FIG. 19.

FIGS. 17 and 18 show a front 232 and a rear 234, respectively, of circuit board 230 with connector ports 210 and 220 exploded from the circuit board 230. The circuit board 230 has a top 231 and a bottom 233. The circuit board 230 includes first and second sets of post openings 236 and first and second sets of pin openings 238 for receiving the front and rear connectors 210, 220 as shown. Further details regarding the circuit board 230, including suitable circuit arrangements, can be found in U.S. Pat. No. 6,608,764, issued Aug. 19, 2003, and entitled "TELECOMMUNICATIONS PATCH PANEL," the disclosure of which is hereby incorporated by reference.

Referring now to FIGS. 19 through 24, each connector port 210, 220 can include a telecommunications jack 280. The example jack 280 shown in the figures is manufactured by the Stewart Co. and is part number SS-7188V-A-NF. Jack 280 includes a body 281 with a top 282, a side defining a plug receiving opening 284, and a board mounting side 285 opposite the plug receiving opening 284.

The plug receiving opening 284 is adapted to receive a plug attached to the end of a telecommunications cable. In a preferred embodiment, the opening 284 is configured to receive a plug on a twisted pair telecomm. cable (i.e., an RJ-45 plug). When an RJ-45 plug is inserted within opening 284, contacts on the plug, which are electrically connected to wires within the telecommunications cable, are placed in electrical contact with springs 286 (FIG. 21) provided in the opening 284. Springs 286 are in electrical contact with pins 283 (FIG. 20) extending from the body 281 on the board mounting side 285. The combination of pins 283 and springs 286 allow wires within the telecommunications cable to be electrically linked with circuits on the circuit board 230 (e.g. see FIG. 27). The pins 283 can be numbered, such as from 1 to 8, as shown in FIG. 24.

A slot 287 (FIG. 21) can also be provided within the plug receiving opening 284 to receive and releasably hold a locking tab of the plug. Typically, the locking tab is located on the opposite side of the plug from the contacts within the plug. In the example shown, the plug receiving opening 284 conforms to an RJ-45 plug standard and is adapted to receive an RJ-45 plug connected to an unshielded twisted pair cable. In other embodiments, however, other similar format plugs and connectors may be adapted within the scope of the present disclosure.

Figure 22:
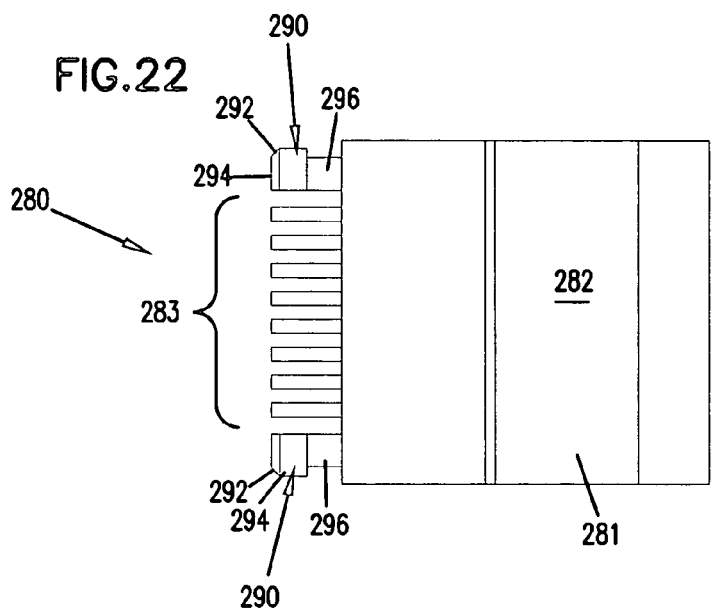
FIG. 22 is a top view of the jack port of FIG. 19.
Figure 23:
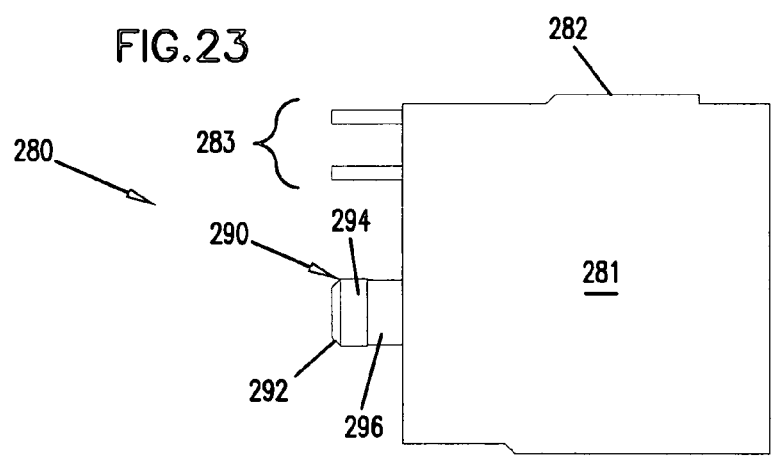
FIG. 23 is a side view of the jack port of FIG. 19.

Additionally, in certain embodiments, posts 290 (FIG. 20) extend from the board mounting side 285 of the connector jacks 280 to allow the connector jacks 280 to be mounted to the circuit board 230. Each post 290 is typically made of a resilient, deformable material. The posts 290 include ramped surfaces 292, a wide portion 294 and a narrower portion 296 (FIG. 22). In some embodiments, the posts 290 are flat on one side and rounded on an opposite side (see FIG. 24). In other embodiments (not shown), however, the posts 290 can curve continuously around a post insertion axis $A_P$ (FIG. 17).

To mount each jack 280 to the circuit board 230, the pins 283 from the jack 280 are inserted through the pin openings 238 in the circuit board 230 and the posts 290 are inserted through the post openings 236. For example, a pair of spaced apart posts 290 can cooperate with a pair of similarly spaced apart post openings 236 in the circuit board 230 (e.g., see FIG. 18) to mount the jacks 280 to the circuit board 230. When the posts 290 are inserted into the post openings 236, the wide portions 294 of each post 290 engage the circuit board 230. Ramped surfaces 292 engage a first side of the circuit board 230 at the post openings 236 and deflect the posts 290 inwardly sufficiently for the wide portions 294 to enter and pass through the post openings 236. When the wide portions 294 have passed through the post openings 236, the posts 290 return to their original shape, forcing the wide portions 294 to engage a second side of the circuit board 230 and to hold jacks 280 to the circuit board 230 (e.g., see FIGS. 18 and 26).

To enable the connector ports 210, 220, such as jacks 280, to be mounted on opposite sides of the circuit board 230, the rear connectors 220 can be inverted with respect to the front connectors 210. The top 212 of each front connection 210 is oriented toward the first edge 231 of the circuit board 230, while the top 222 of each rear connector 220 is oriented toward the opposite edge 233 of the circuit board 230 (see FIG. 27). A plug oriented for insertion into one of the front connectors 210 would need to be rotated about the axis of insertion $A_I$ (FIG. 26) one half turn to fit within one of the rear connectors 220. FIG. 27 illustrates the inverted orientation of the springs 216, 226, and the tops 212, 222 of the front and rear connector ports 210, 220 when mounted to the circuit board 230 in the illustrated embodiment.

Referring now to FIGS. 28-32, the circuit board 230 can be positioned within a rear housing shell 260 after at least the rear connectors 220 have been mounted to the circuit board 230. Preferably, the rear connectors 220 are positioned relative to the rear housing shell 260 after both the front and rear connectors 210, 220 have been mounted to the circuit board 230 (e.g., see FIG. 28). In the example shown, the rear housing shell 260 is positioned over the rear 234 of the circuit board 230 before the front housing shell 250 is positioned over the front 232 to capture the circuit board 230. In other embodiments, however, the front housing shell 250 can be positioned over the front 232 of the circuit board 230 first.

The rear housing shell 260 includes a faceplate 261 secured to a top portion 264, a bottom portion 266, and a first side portion 263, and a second side portion 265 (FIG. 29). The faceplate 261 defines an opening 262 configured to enable access to the rear connector ports 220 through the faceplate 261. In the example shown, the opening 262 is defined in a bottom portion of the faceplate 261 (FIG. 30). In certain embodiments, stops 268 (which limit rotation of the connection modules 200 as discussed above) can protrude from at least one of the first and second side portions 263, 265 (e.g., see FIG. 31).

As best seen in FIGS. 31 and 32, a connection member 270 extends from each side 263, 265 of the rear housing 260. Each connection member 270 is configured to overlap a portion of the front housing shell 250 to facilitate securing together of the housing shells 250, 260. In the example shown, each connection member 270 defines two openings 272 through which fasteners, such as fasteners 275 of FIG. 16, can pass to secure the rear housing 260 to the front housing 250. Each connection member 270 can also define a notch 271 that cooperates with a faceplate 251 of the front housing 250 to form a second detent 274 (FIG. 16), which can cooperate with a lock 140 to inhibit rotation of the connection module 200 (as discussed above). In other embodiments, the connection members 270 interact with sides 253, 255 of the front housing 250 (FIG. 35) to form the detent 274. A similar detent 274 can also be defined between the faceplate 261 and each side 263, 265 (see FIG. 29).

Referring to FIGS. 33-38, the front housing shell 250 can be positioned over the circuit board 230 after at least the front connectors 210 have been mounted to the circuit board 230. Preferably, the front housing shell 250 is attached to the rear housing shell 260 after the rear housing shell 260 has been positioned over the circuit board 230 (e.g., see FIG. 33). The front housing shell 250 includes a faceplate 251 (FIG. 34) secured to a top portion 254 and a bottom portion 256 (FIG. 35). The front housing shell 250 can also include side portions 253 and 255 (FIG. 35).

Figure 33:
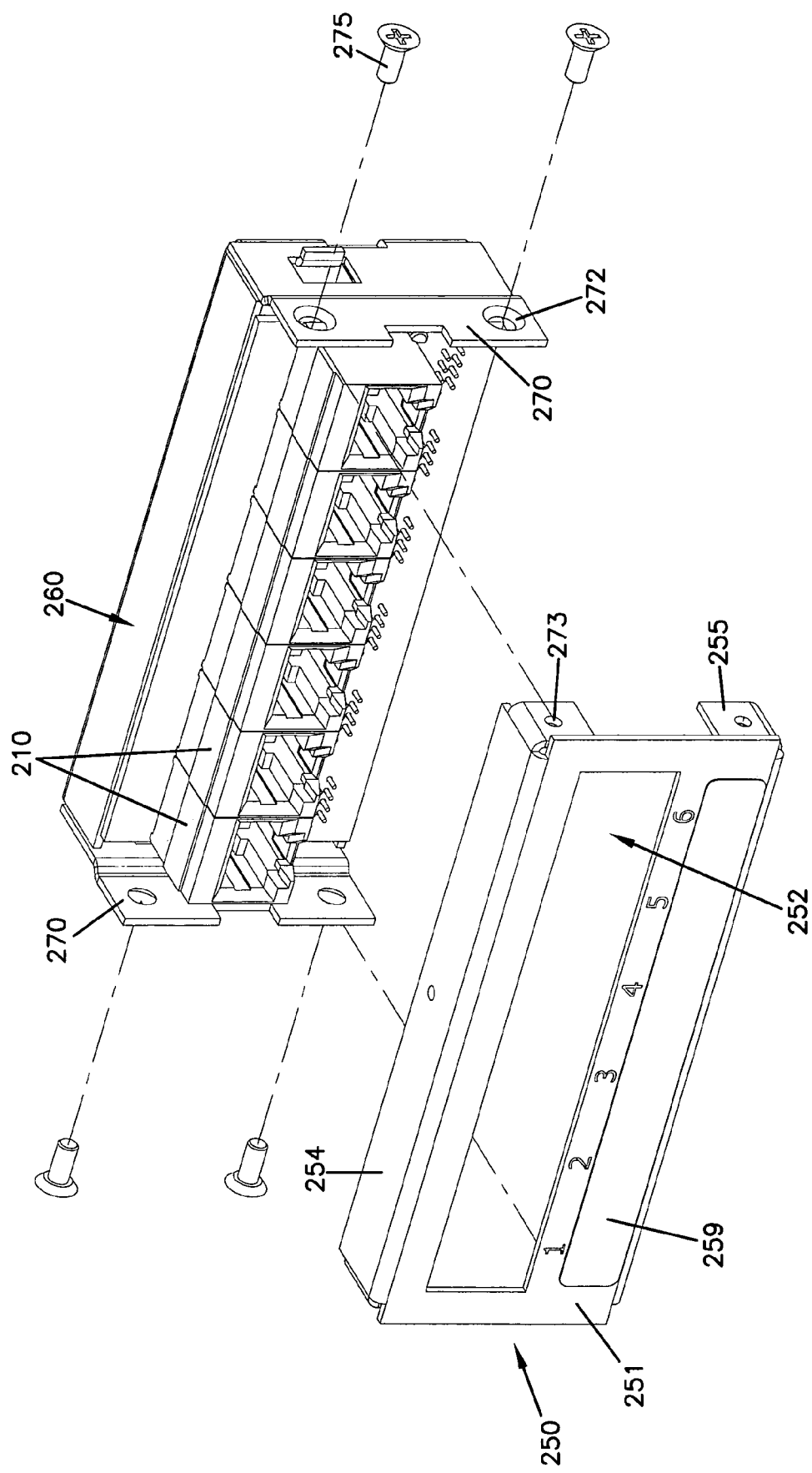
FIG. 33 is a front perspective view of a front housing shell exploded from the rear housing shell, circuit board, and connector ports of FIG. 28.

The faceplate 251 defines an opening 252 configured to enable access to the front connectors 210 through the faceplate 251 (e.g., see FIG. 33). In the example shown, the opening 252 is defined in a top portion of the faceplate 251 (FIG. 38). The top and bottom portions 254, 256 of the front housing shell 250 define depressions or openings 258 (best seen in FIGS. 35 and 36) into which the pins 119 (FIG. 10) protrude to rotatably mount the connection modules 200 to the frame 110.

Sides portions 253, 255 define openings 273 (FIG. 37) through which fasteners 275 (FIG. 33) extend after passing through opening 272 in the connection members 270 of the rear housing shell 260 to secure the housing shells 250, 260 together. In some embodiments, each side 253, 255 includes a first segment extending from the top portion 254 and a second segment extending from the bottom portion 256 (e.g., see FIG. 35). In other embodiments (not shown), each side portion can include a single segment extending between the top portion 254 and the bottom portion 256 and having a notch similar to the notch 271 of the connection member 270.

Referring now to FIGS. 39 and 40, in certain embodiments, the housing shells 250, 260 can include indicia receiving areas 257, 267, respectively, adapted to receive indicia strips 259, 269, respectively. Typically, the indicia receiving areas 257, 267 are located adjacent the openings 252, 262 in the faceplate 251, 261, respectively. The indicia strips 259, 269 can include markings indicating the circuits connected to the connector ports 210, 220, respectively. The indicia strips 259, 269 can be coupled to the housing shells 250, 260 using adhesive, fasteners, or any desired securement means.

In certain embodiments, numbers or other indicia are provided on the connection modules 200, such as on the faceplates 251, 261 of the housing shells 250, 260 adjacent each connector port 210, 220 to identify each of the connector ports 210, 220 (e.g., see FIGS. 39 and 40). As shown in FIG. 1, the numbers can increase sequentially with each connection module 200, so that each front connector port 210 of the patch panel assembly 100 can be identified by a unique number and each rear connector port 220 can be matched to one of the front connector ports 210. In other embodiments, the numbers can restart at each connection module 200.

In certain embodiments, an indicia sheet can also be coupled to the frame 110 separate from the connection modules 200. For example, an indicia sheet 160 can be affixed to a front side of the panel 116 of the frame 110 (e.g., see FIG. 1). The indicia sheet 160 can be marked to indicate the circuits or equipment coupled to each connector port 210, 220. The numbers marked on the connection module housings 250, 260 can be used to identify the connector ports 210, 220 on the indicia sheet 160.

The above specification and examples provide a complete description of the assembly and use of the invention. Since many embodiments of the invention can be made without departing from the spirit and scope of the invention, the invention resides in the claims hereinafter appended.

We claim:

1. A telecommunications patch panel comprising:
   a frame having a length that extends from a first end to a second end of the frame, the frame including a left mounting bracket positioned at the first end of the frame and a right mounting bracket positioned at the second end of the frame, the frame also including upper and lower portions that extend along the length of the frame; and
   a plurality of connector modules mounted between the upper and lower portions of the frame and between the first and second ends of the frame, each of the connector modules including a front side at which a plurality of front connectors are located and a rear side at which a plurality of rear connectors are located, the connector modules being pivotally movable about generally upright pivot axes that extend between the upper and lower portions of the frame, each connector module including:
   a circuit board having a first side and a second, opposite side;
   a plurality of front connector ports mounted to the first side of the circuit board;
   a plurality of rear connector ports mounted to the second side of the circuit board; and
   a housing enclosing the circuit board, the front connector ports, and the rear connector ports, the housing being formed from a first housing shell cooperating with a second housing shell to capture the circuit board, the front connector ports, and the rear connector ports.

2. The telecommunications patch panel of claim 1, wherein the first housing shell includes a faceplate defining an elongate opening through which the front connector ports extend when the circuit board is enclosed within the housing; and wherein the second housing shell includes a faceplate defining an elongate opening through which the rear connector ports extend when the circuit board is enclosed within the housing.

3. The telecommunications patch panel of claim 1, wherein at least one of the front housing shell and the rear housing shell includes an indicia receiving area.

4. The telecommunications patch panel of claim 1, wherein insertion axes of the front jack ports are in a different plane than insertion axes of the rear jack ports.

5. The telecommunications patch panel of claim 1, wherein the front connector ports include RJ-45 ports.

6. The telecommunications patch panel of claim 1, wherein the rear connector ports include RJ-45 ports.

7. The telecommunications patch panel of claim 1, wherein the frame defines a linear array of openings, the linear array extending from the first end to the second end of the frame, each opening of the linear array extending between the upper and lower portions of the frame.

8. The telecommunications patch panel of claim 7, wherein each connector module of the plurality mounts within one opening of the linear array.

9. The telecommunications patch panel of claim 1, further comprising a plurality of locks mounted to the frame, the locks configured to fix the connector modules in a pivoted position.

10. The telecommunications patch panel of claim 9, wherein each of the locks of the plurality include a lock bracket extending between the upper and lower portions of the frame.

11. The telecommunications connection module of claim 9, wherein the lock fixes one of the connector modules in position by engaging with a detent defined in the housing of the connector module.

* * * * *